(12) United States Patent  
Hammond

(10) Patent No.: US 9,688,195 B1
(45) Date of Patent: Jun. 27, 2017

(54) VEHICLE OCCUPANCY INDICATION SAFETY SYSTEM

(71) Applicant: Mark Hammond, Hillsboro, OR (US)

(72) Inventor: Mark Hammond, Hillsboro, OR (US)

(*) Notice: Subject to any disclaimer, the term of this patent is extended or adjusted under 35 U.S.C. 154(b) by 0 days.

(21) Appl. No.: 14/963,787

(22) Filed: Dec. 9, 2015

(51) Int. Cl.
B60Q 1/00 (2006.01)
B60Q 9/00 (2006.01)
B60N 2/44 (2006.01)

(52) U.S. Cl.
CPC ............ B60Q 9/00 (2013.01); B60N 2/44 (2013.01); B60N 2002/4485 (2013.01)

(58) Field of Classification Search
CPC ..... B60Q 9/00; B60N 2/44; B60N 2002/4485
See application file for complete search history.

(56) References Cited

U.S. PATENT DOCUMENTS

| | | | |
|---|---|---|---|
| D452,833 S | 1/2002 | Ito et al. | |
| 6,535,137 B1* | 3/2003 | Ryan | B60R 21/01556 340/457 |
| 6,809,640 B1* | 10/2004 | Sherman | B60R 22/48 340/457.1 |
| 6,812,844 B1 | 11/2004 | Burgess | |
| 6,847,302 B2 | 1/2005 | Flanagan et al. | |
| 6,870,472 B2 | 3/2005 | Gift et al. | |
| 6,922,147 B1 | 7/2005 | Viksnins et al. | |
| 7,012,533 B2* | 3/2006 | Younse | B60N 2/002 180/273 |
| 7,106,207 B1 | 9/2006 | Marchan | |
| 7,218,218 B1 | 5/2007 | Rogers | |
| 7,786,852 B2 | 8/2010 | Kautz | |
| 8,892,302 B1* | 11/2014 | McDonald | G08B 21/24 701/36 |
| 2004/0164856 A1* | 8/2004 | Mesina | B60N 2/002 340/457.1 |
| 2005/0057350 A1* | 3/2005 | Younse | B60N 2/002 340/457.1 |
| 2006/0033613 A1 | 2/2006 | Reece | |
| 2006/0273917 A1* | 12/2006 | Rams | B60N 2/002 340/667 |
| 2009/0079557 A1* | 3/2009 | Miner | B60N 2/002 340/457.1 |
| 2013/0106598 A1* | 5/2013 | Silveira | B60N 2/002 340/457.1 |

(Continued)

Primary Examiner — Sisay Yacob

(57) ABSTRACT

A vehicular safety system includes a vehicle that has a plurality of seat belts, an alarm and an ignition. Each of the seat belts is operationally coupled to the alarm and the ignition. A car seat is provided that has a belt and a clasp. The car seat is removably positioned within the vehicle. A conductor is coupled to the car seat and the conductor is selectively electrically coupled between the clasp and one of the seat belts when the car seat is occupied. Thus, the alarm detects when the conductor is operationally coupled to the buckle. The alarm generates an alarm sequence when the ignition is turned off and the conductor is electrically coupled between the clasp and the buckle. The alarm sequence includes an audible alarm such that the alarm may inhibit an occupant from being inadvertently left in the vehicle. A switch is positioned within the vehicle such that the may be manipulated. The switch is electrically coupled to the alarm and the switch de-actuates the alarm when the switch is manipulated.

2 Claims, 5 Drawing Sheets

(56) References Cited

U.S. PATENT DOCUMENTS

2014/0052342 A1* 2/2014 Seibert ............... B60N 2/002
 701/45
2014/0253314 A1* 9/2014 Rambadt ............ B60N 2/002
 340/457.1

* cited by examiner

VEHICLE OCCUPANCY INDICATION SAFETY SYSTEM

BACKGROUND OF THE DISCLOSURE

Field of the Disclosure

The disclosure relates to safety devices and more particularly pertains to a new safety device for preventing an occupant from being inadvertently left in a vehicle.

SUMMARY OF THE DISCLOSURE

An embodiment of the disclosure meets the needs presented above by generally comprising a vehicle that has a plurality of seat belts, an alarm and an ignition. Each of the seat belts is operationally coupled to the alarm and the ignition. A car seat is provided that has a belt and a clasp. The car seat is removably positioned within the vehicle. A conductor is coupled to the car seat and the conductor is selectively electrically coupled between the clasp and one of the seat belts when the car seat is occupied. Thus, the alarm detects when the conductor is operationally coupled to the buckle. The alarm generates an alarm sequence when the ignition is turned off and the conductor is electrically coupled between the clasp and the buckle. The alarm sequence includes an audible alarm such that the alarm may inhibit an occupant from being inadvertently left in the vehicle. A switch is positioned within the vehicle such that the switch may be manipulated. The switch is electrically coupled to the alarm and the switch de-actuates the alarm when the switch is manipulated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
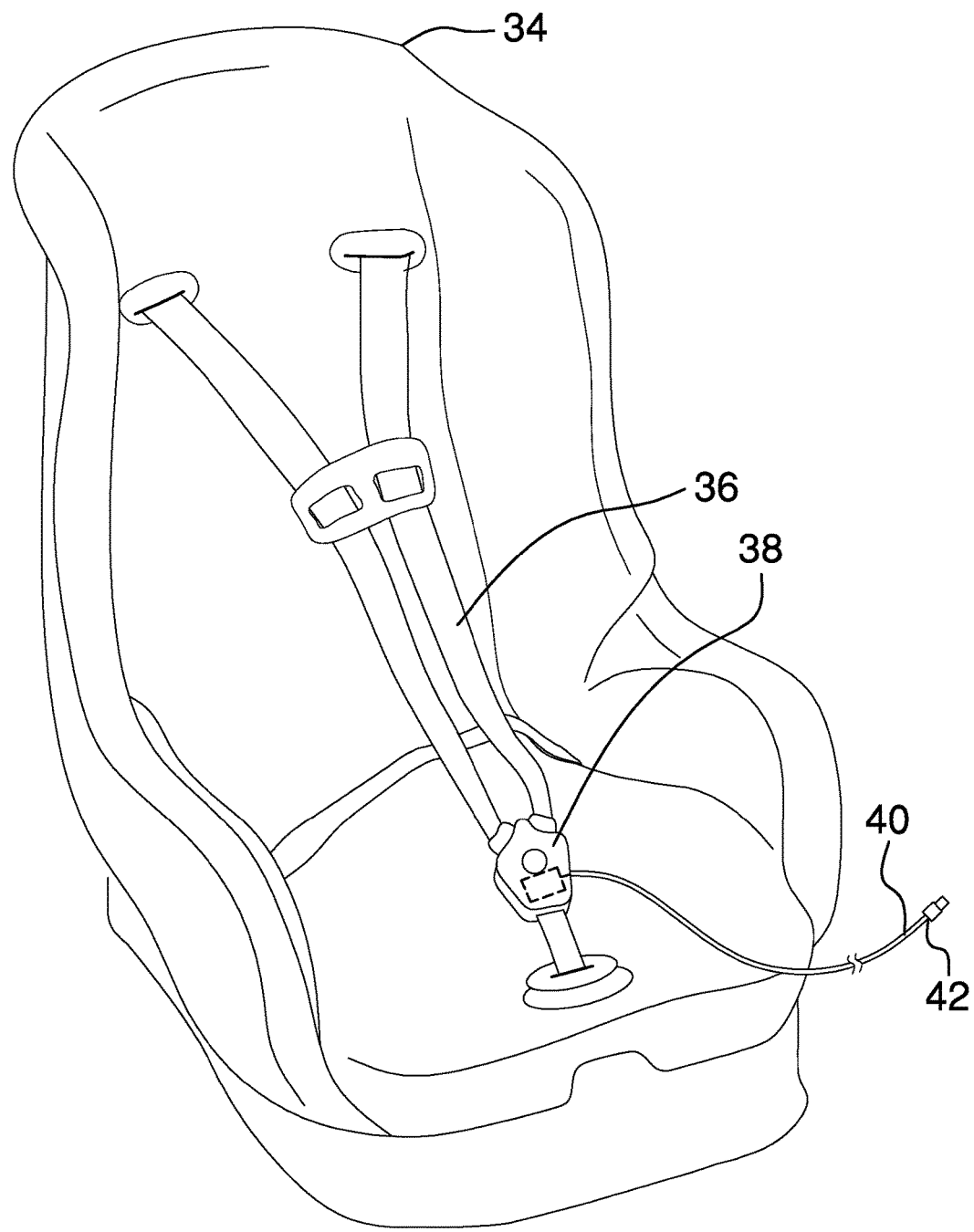
FIG. 1 is a front perspective view of a vehicular safety system according to an embodiment of the disclosure.
Figure 2:
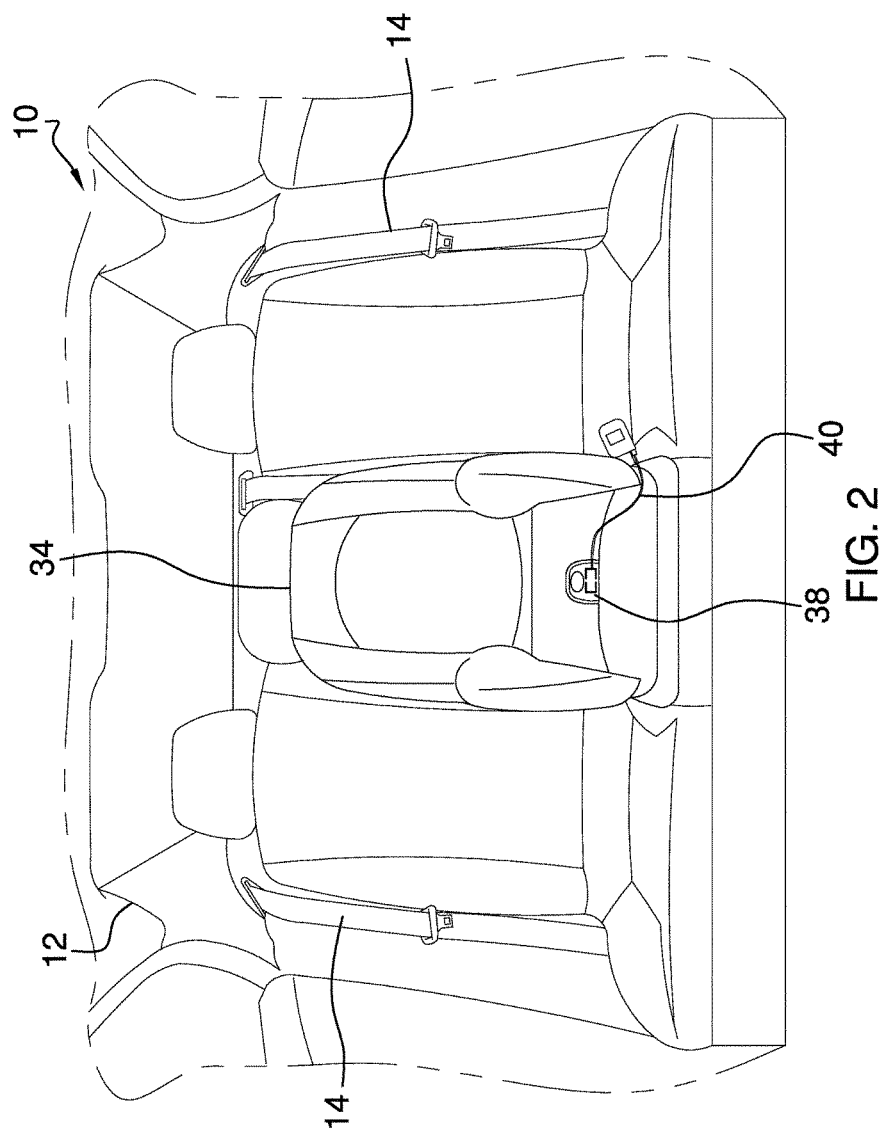
FIG. 2 is a front view of an embodiment of the disclosure.
Figure 3:
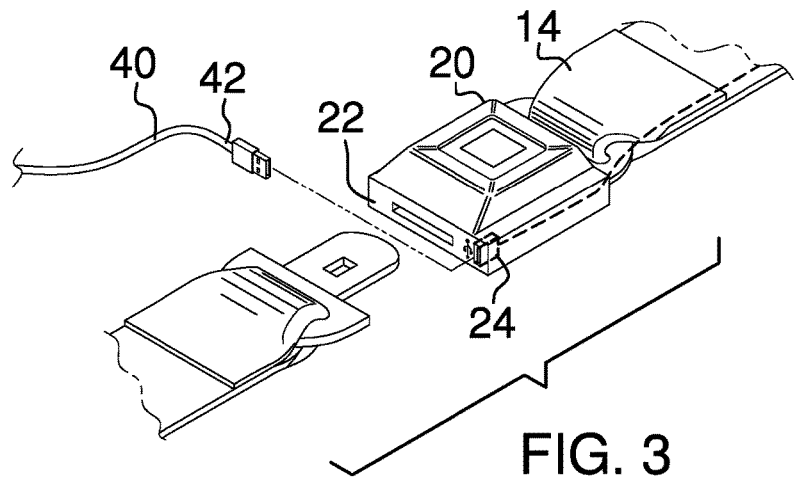
FIG. 3 is a perspective view of an embodiment of the disclosure.
Figure 4:
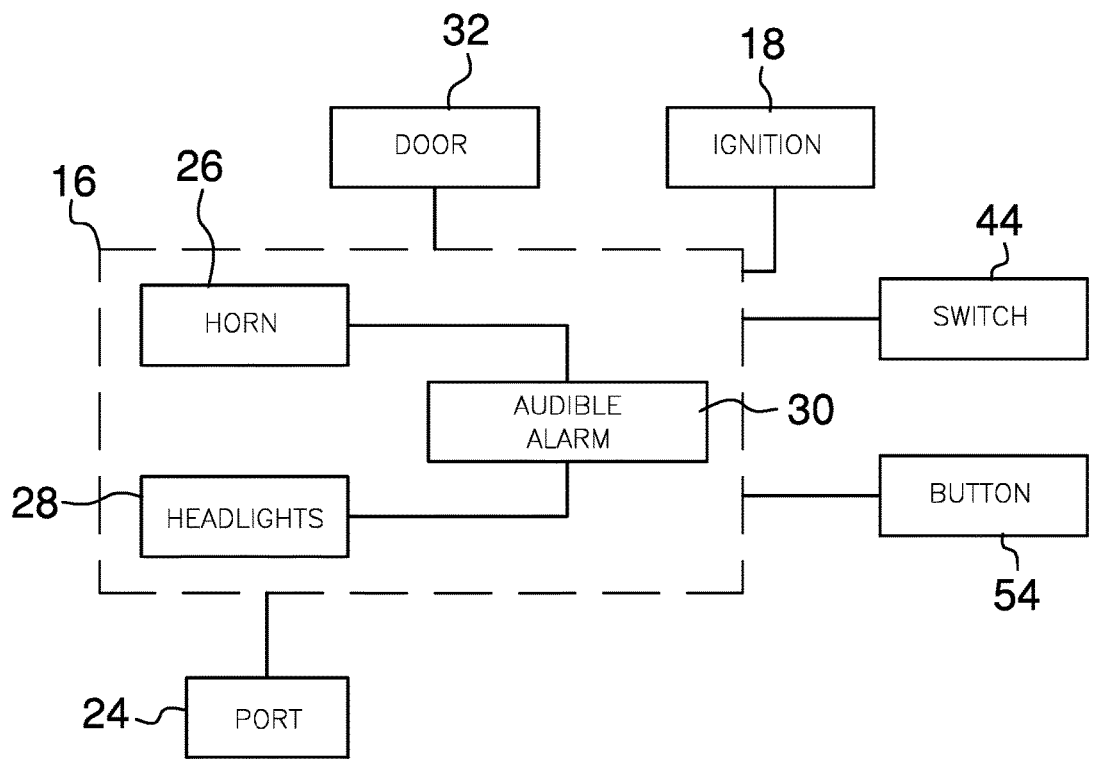
FIG. 4 is a schematic view of an embodiment of the disclosure.

With reference now to the drawings, and in particular to FIGS. 1 through 6 thereof, a new safety device embodying the principles and concepts of an embodiment of the disclosure and generally designated by the reference numeral 10 will be described.

As best illustrated in FIGS. 1 through 6, the vehicular safety system 10 generally comprises a vehicle 12 that has a plurality of seat belts 14, an alarm 16 and an ignition 18. The alarm 16 may include an electronic timer 19. Each of the seat belts 14 is operationally coupled to the alarm 16 and the ignition 18 and each of the seat belts 14 has a buckle 20. The buckle 20 on each of the seat belts 14 has a receiving end 22 and the receiving end 22 has a port 24 that is coupled thereto. The port 24 is electrically coupled to the alarm 16 and the ignition 18. Additionally, the alarm 16 is electrically coupled to the ignition 18. The vehicle 12 may be a passenger vehicle or the like and the vehicle 12 may be manufactured with the port 24 on the buckle 20 of each of the seat belts 14.

The port 24 may comprise a USB port or the like. The alarm 16 may include a horn 26 of the vehicle 12, headlights 28 of the vehicle 12 and an audible alarm 30 of the vehicle 12. The audible alarm 30 may comprise a chime, an electronic tone or any conventional means of audible alarms utilized in the convention of automobile manufacturing. Additionally, the alarm 16 detects when a door 32 of the vehicle 12 is opened and when a driver of the vehicle 12 is no longer seated in the vehicle 12.

A car seat 34 is provided that has a belt 36 and a clasp 38. The car seat 34 is removably positioned within the vehicle 12 and the car seat 34 may be a child car seat or the like. A conductor 40 is provided and the conductor 40 is coupled to the car seat 34. The conductor 40 is selectively operationally coupled between the clasp 38 and one of the seat belts 14 when the car seat 34 is occupied such that the alarm 16 detects when the conductor 40 is operationally coupled to the buckle 20. The conductor 40 may comprise a USB cord or the like.

The conductor 40 has a distal end 42 with respect to the clasp 38 and the distal end 42 is selectively electrically coupled to the port 24. The distal end 42 is selectively uncoupled from the port 42 thereby facilitating the alarm 16 to be de-actuated. The alarm 16 generates an alarm sequence when the ignition 18 is turned off, the door 32 is opened and the conductor 40 is electrically coupled between the clasp 38 and the buckle 20. The alarm 16 does not generate the alarm sequence under any circumstances when the distal end 42 of the conductor 40 is uncoupled from the port 24. A switch 44 is positioned within the vehicle 12 such that the switch 44 may be manipulated. The switch 44 is electrically coupled to the alarm 16 and the switch 44 de-actuates the alarm 16 when the switch 44 is manipulated.

Figure 5:
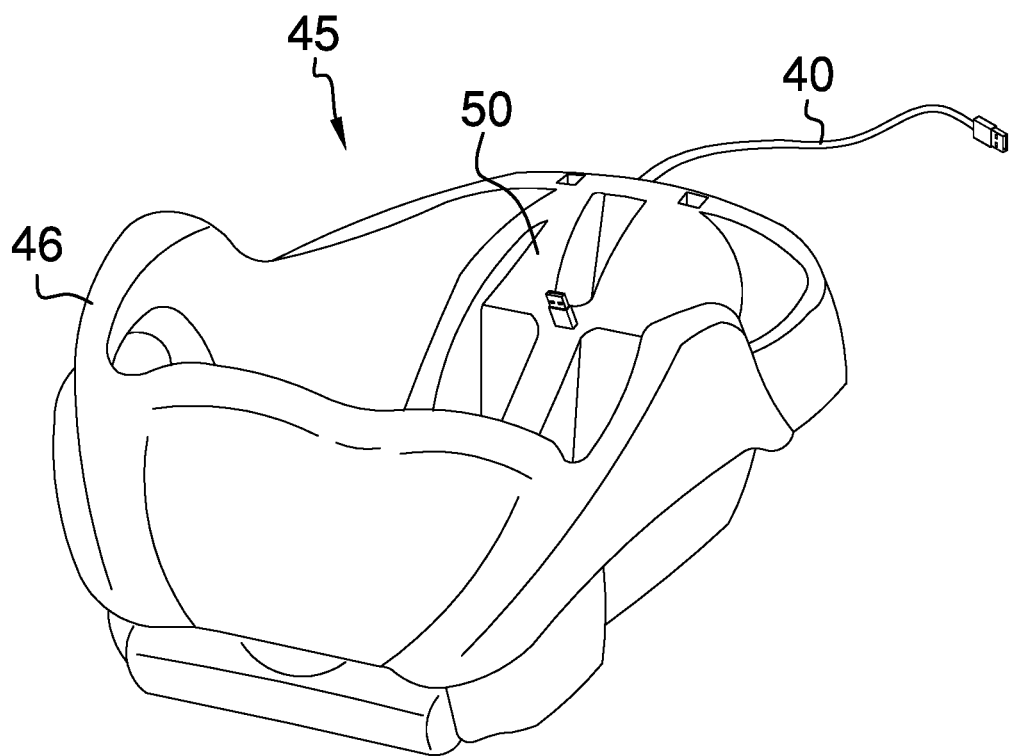
FIG. 5 is a front perspective view of an alternative embodiment of the disclosure.
Figure 6:
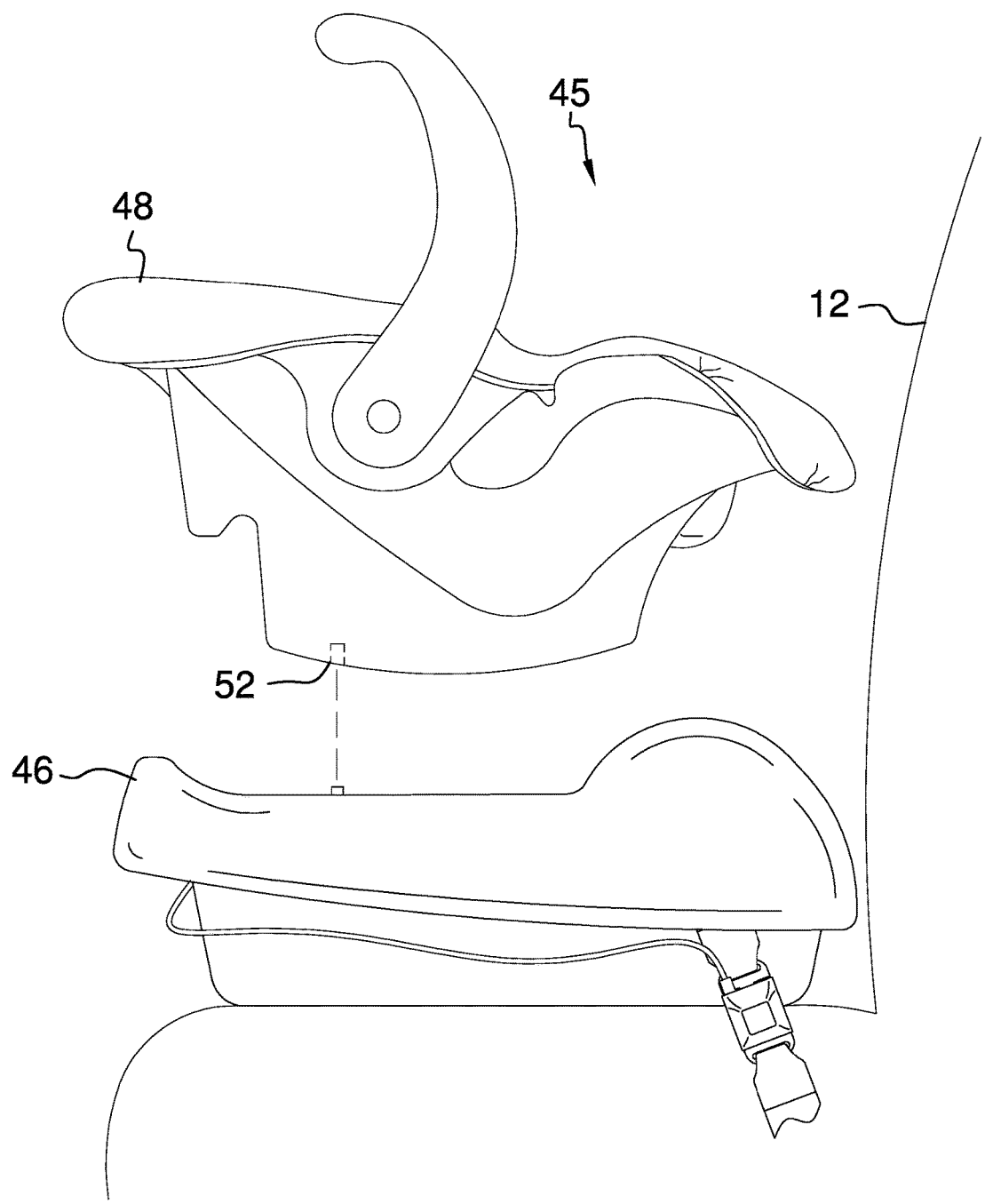
FIG. 6 is a perspective in-use view of an alternative embodiment of the disclosure.

In an alternative embodiment 45 as shown in FIGS. 5 and 6, the car seat 34 may include a base 46 and a carrier 48. The base 46 insertably receives the carrier 48. The base 46 has a lower wall 50 and the conductor 40 extends through the lower wall 50. The carrier 48 has a port 52 coupled thereto and the port on the carrier 48 is electrically coupled to the conductor 40 when the carrier 48 is positioned within the base. Thus, the carrier 48 is electrically coupled to the alarm 16 and the alarm 16 detects when the carrier 48 is positioned in the base 46.

A button 54 may be provided and the button 54 may be coupled to the door 32 of the vehicle 12. The button 54 is electrically coupled to the alarm 16. The button 54 is manipulated if the driver wishes to leave the child or other occupant in the vehicle 12 after the driver exits the vehicle 12. Thus, the alarm 16 is de-actuated while the child or other occupant remains unattended in the vehicle 12.

In use, the car seat 34 is utilized to restrain the child in the vehicle 12. The distal end 42 of the conductor 40 is coupled to the port 24 on the buckle 20. The alarm 16 generates the alarm sequence when the ignition 18 is turned off, the door 32 has been opened, the driver is not seated in the vehicle 12 and the conductor 40 is coupled to the port 24. Thus, the driver of the vehicle 12 is reminded that the child or other occupant remains restrained in the vehicle 12. The switch 44 is manipulated to de-actuate the alarm 16 if the driver wishes to leave the child or other occupant unattended in the vehicle 12. The button 54 and the switch 44 are manipulated if the driver wishes to lock the door 32 while the child or other occupant is to be left unattended in the vehicle 12.

If the door 32 is closed when the alarm 16 is actuated, the horn of the vehicle 12 and the headlights of the vehicle are actuated to remind the driver that the driver has left the child or other occupant in the vehicle 12. If the door 32 is closed but not locked the alarm 16 generates a brief alarm sequence ranging from five to ten seconds. The alarm 16 generates the full alarm sequence if the button 54 is not manipulated during the brief alarm sequence. The alarm 16 generates the alarm sequence if the door 32 is locked and any of the seat belts 14 are coupled. The alarm 16 generates the alarm sequence after a duration of time ranging between one minute and two minutes when the button 54 and switch 44 have been manipulated and the child or occupant is left unattended in the vehicle 12. Thus, the driver is reminded that the child or occupant remains unattended in the vehicle 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicular safety system comprising:
   a vehicle having a plurality of seat belts, an alarm and an ignition, each of said seat belts being operationally coupled to said alarm and said ignition, each of said seat belts having a respective buckle, said buckle on each of said seat belts having a receiving end, each said receiving end having a respective port being coupled thereto, said port being electrically coupled to said alarm and said ignition, said alarm being electrically coupled to said ignition;
   a car seat having a belt and a clasp, said car seat being removably positioned within said vehicle;
   a conductor being coupled to said car seat and extending from said clasp, said conductor being selectively electrically coupled between said clasp and one of said seat belts by insertion of a distal end of said conductor into said port when said car seat is occupied such that said alarm detects when said conductor is operationally coupled to said buckle indicating said car seat is occupied, said alarm generating an alarm sequence when said ignition is turned off and said conductor remains engaged to said port, said alarm sequence including an audible alarm such that said alarm is configured to inhibit an occupant from being inadvertently left in said vehicle; and
   a switch being positioned within said vehicle wherein said switch is configured to be manipulated, said switch being electrically coupled to said alarm, said switch de-actuating said alarm when said switch is manipulated.

2. A vehicular safety system comprising:
   a vehicle having a plurality of seat belts, an alarm and an ignition, each of said seat belts being operationally coupled to said alarm and said ignition, each of said seat belts having a buckle, said buckle on each of said seat belts having a receiving end, said receiving end having a port being coupled thereto, said port being electrically coupled to said alarm and said ignition, said alarm being electrically coupled to said ignition;
   a car seat having a belt and a clasp, said car seat being removably positioned within said vehicle;
   a conductor being coupled to said car seat and extending from said clasp, said conductor being selectively operationally coupled between said clasp and one of said seat belts by engagement of said conductor to said port when said car seat is occupied such that said alarm detects when said conductor is operationally coupled to said buckle as an indication of occupancy of said car seat, said alarm generating an alarm sequence when said ignition is turned off and said conductor electrically couples said clasp to said buckle indicating occupancy of said car seat, said alarm sequence including an audible alarm such that said alarm is configured to inhibit an occupant from being inadvertently left in said vehicle, said conductor having a distal end with respect to said clasp, said distal end being selectively electrically coupled to said port, said distal end being selectively uncoupled from said port such that said alarm is de-actuated; and
   a switch being positioned within said vehicle wherein said switch is configured to be manipulated, said switch being electrically coupled to said alarm, said switch de-actuating said alarm when said switch is manipulated.

* * * * *